United States Patent
Roychowdhury et al.

(10) Patent No.: US 11,481,664 B2
(45) Date of Patent: Oct. 25, 2022

(54) METHODS AND SYSTEMS FOR GENERATING DEVICE-SPECIFIC MACHINE LEARNING MODEL

(71) Applicant: General Electric Company, Schenectady, NY (US)

(72) Inventors: Subhrajit Roychowdhury, Schenectady, NY (US); Naresh Iyer, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 16/122,184

(22) Filed: Sep. 5, 2018

(65) Prior Publication Data

US 2020/0073850 A1 Mar. 5, 2020

(51) Int. Cl.
  *G06N 20/00* (2019.01)
  *B33Y 40/00* (2020.01)
  (Continued)

(52) U.S. Cl.
  CPC .............. *G06N 20/00* (2019.01); *B33Y 40/00* (2014.12); *B33Y 50/02* (2014.12); *G06F 30/23* (2020.01); *G06F 2119/18* (2020.01)

(58) Field of Classification Search
  CPC ........ G06N 20/00; B33Y 40/00; B33Y 50/02; G06F 30/23; G06F 2119/18; B22F 10/30; B22F 10/20; Y02P 10/25
  See application file for complete search history.

(56) References Cited

U.S. PATENT DOCUMENTS 5,430,666 A  7/1995 DeAngelis et al.
9,749,691 B2 * 8/2017 Cremonesi ........... H04N 21/252
(Continued)

FOREIGN PATENT DOCUMENTS

WO  2016198885 A1  12/2016

OTHER PUBLICATIONS

Balta et al., A Centralized Framework for System-Level Control and Management of Additive Manufacturing Fleets, Aug. 20-24, 2018, 2018 IEEE 14th International Conference on Automation Science and Engineering (CASE), Munich, Germany, pp. 1071-1078. (Year: 2018).*

(Continued)

*Primary Examiner* — Sarang Afzali
(74) *Attorney, Agent, or Firm* — Dority & Manning, P.A.

(57) ABSTRACT

A method of transferring operational parameter sets between different domains of additive manufacturing machines includes creating a first machine domain parameter set in a first machine domain, accessing a model of a second additive manufacturing in a second machine domain, creating a second machine domain parameter set by applying transfer learning techniques including learning differences between the first machine domain and the second machine domain, adjusting the first machine domain parameter set using the differences before incorporation into the second machine domain to obtain the second machine domain parameter set, the second machine domain parameter set representing operational settings for the second additive manufacturing machine, the second additive manufacturing machine producing a product sample, determining if the product sample is within quality assurance metrics, and if the product sample is not within the quality assurance metrics, adjusting the second machine domain parameter set.

20 Claims, 3 Drawing Sheets

(51) Int. Cl.
  *B33Y 50/02* (2015.01)
  *G06F 30/23* (2020.01)
  *G06F 119/18* (2020.01)

(56) References Cited

U.S. PATENT DOCUMENTS

| | | |
|---|---|---|
| 9,855,698 B2 | 1/2018 | Perez et al. |
| 9,977,425 B1 | 5/2018 | McCann et al. |
| 9,981,341 B2 | 5/2018 | Mazumder et al. |
| 2017/0203512 A1 | 7/2017 | Gold |
| 2017/0252816 A1 | 9/2017 | Shim et al. |

OTHER PUBLICATIONS

Cheng et al., A Statistical Transfer Learning Perspective for Modeling Shape Deviations in Additive Manufacturing, Oct. 2017, IEEE Robotics and Automation Letters, vol. 2, No. 4, pp. 1988-1993. (Year: 2017).*

Pan, Sinno Jialin et al., "A Survey on Transfer Learning", IEEE Transactions on Knowledge and Data Engineering, vol. No. 22, Issue No. 10, Oct. 2010, Digital Object Indentifier 10.1109/TKDE.2009.191, (pp. 1345-1359, 15 total pages).

Zhu, Zuowei et al., "Machine learning in Tolerancing for Additive Manufacturing", CIRP Annals, May 2, 2018, https://doi.org/10.1016/j.cirp.2018.04.119, 4pgs.

Anonymous, "Transfer learning—Wikipedia", Nov. 5, 2019, retrieved from the internet, URL: https://en.wikipedia.org/wiki/Transsfer_learning.

Balta et al, "A Centralized Framework for System-Level Control and Management of Additive Manufacturing Fleets", 2018 IEEE 14$^{th}$ International Conference On Automation Science And Engineering (Case), IEEE, Aug. 20, 2018, pp. 1071-1078 (Abstract Only).

* cited by examiner

METHODS AND SYSTEMS FOR GENERATING DEVICE-SPECIFIC MACHINE LEARNING MODEL

BACKGROUND

The term "additive manufacturing" refers to processes used to synthesize three-dimensional objects in which successive layers of material are formed by an additive manufacturing machine under computer control to create an object.

A file containing a 3D computer-aided design (CAD) model of the object to be manufactured is used to control an additive metal manufacturing machine. One example of additive manufacturing is direct metal laser sintering (DMLS), which uses a laser fired into a bed of powdered metal, with the laser being aimed automatically at points in space defined by a 3D model, thereby melting the material together to create a solid structure. The nature of the rapid, localized heating and cooling of the melted material enables near-forged material properties, after any necessary heat treatment is applied. In this manner, parts are built up additively layer by layer. Complex geometries can be created directly from the 3D CAD file data.

FIG. 1 schematically illustrates a cross-sectional view of a conventional laser additive manufacturing system 100 (e.g., Direct Metal Laser Melting (DMLM), Direct Metal Laser Sintering (DMLS), Selective Laser Melting (SLM), etc.). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 (traveling in direction 134) to maintain the powder at a level 118 within a deposition volume 112. Excess powder material extending above the powder level 118 is removed by recoater arm 116 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern or "mark" for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress relief process. Additionally, thermal, mechanical, and chemical post processing procedures can be used to finish the part 122.

A problem with additive machines is that a scan parameter set developed on one machine is not exactly transferable to be applicable on another machine, whether it is the same machine model or a different machine model. Conventionally, a scan parameter set for a product needs to be reworked and/or redeveloped to arrive at a scan parameter set to move product production from one machine line to a different machine. Scan parameter sets need to be reworked even for different instances of the same line of machine. The reworking/redevelopment of the scan parameter set can be time and labor intensive. Additionally, prove-out of the scan parameter set often requires multiple builds and reiteration to arrive at an acceptable scan parameter set. These multiple builds reduce machine production time, and absorb raw material supplies.

Either the machine needs to maintain a tight calibration or the scan parameter set needs to be tuned, adjusted, and/or manipulated to get material properties within tolerance limits and quality goals for the product. Current methods for either option is time consuming, labor intensive, and wasteful of machine productivity. What is needed in the art is an approach to transfer parameter sets between machines when moving an item's production.

DETAILED DESCRIPTION

Figure 1:
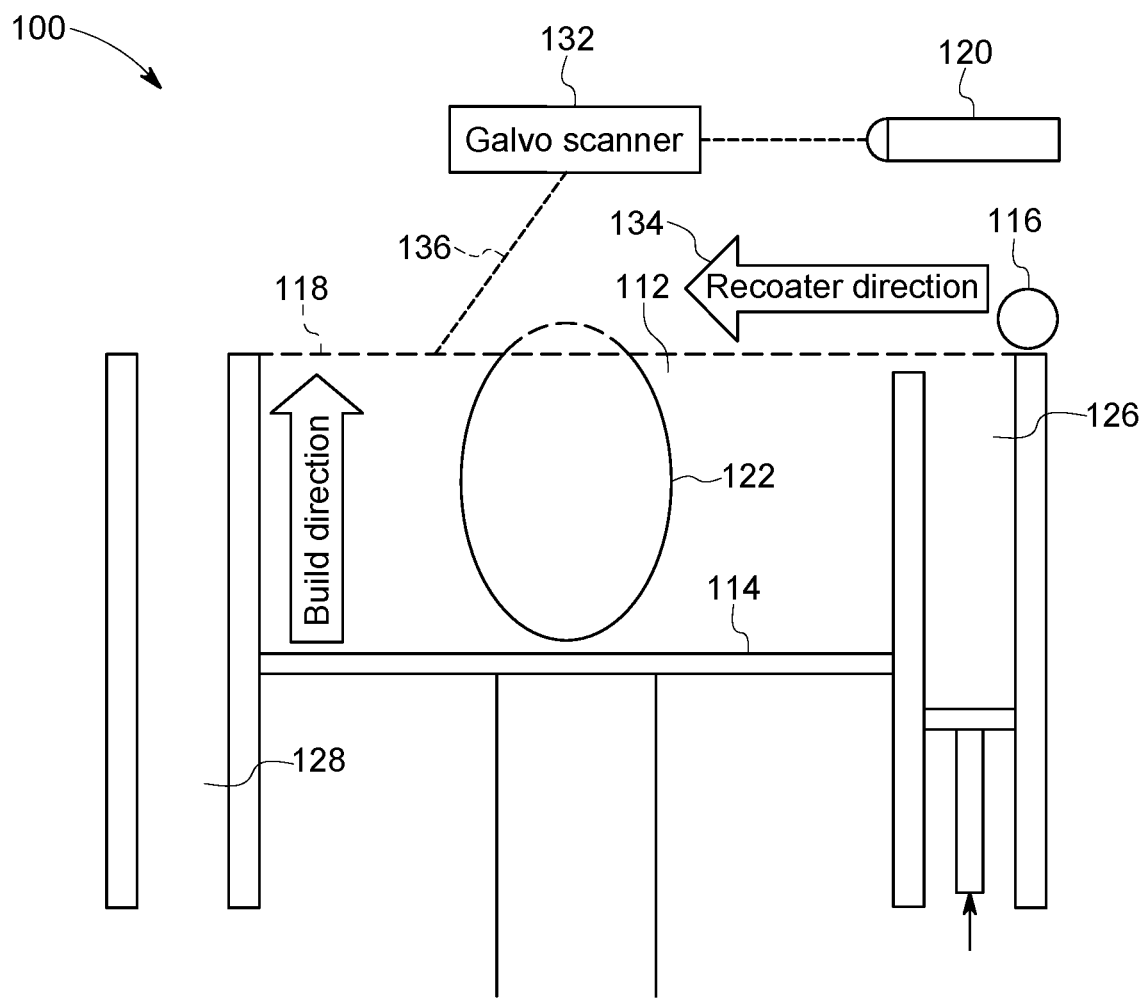
FIG. 1 schematically illustrates a conventional laser additive manufacturing apparatus.

Embodying systems and methods combine system identification and transfer learning to characterize a first additive manufacturing machine (herein: "additive manufacturing machine" or "additive machine"). A sensor suite monitoring conditions/parameters in the first additive machine are used to transfer a first parameter set for a material into a second parameter set operable to set conditions for the same material on another additive machine (whether the same machine line, or another machine line). This transfer of the parameter set between the first and second additive machines can be done automatically based on the monitored sensor data. Automatic parameter set transfer between additive machines reduces costly (monetary, labor, and time) design of experiments (DOE) and/or labor intensive machine recalibration needed by conventional approaches to switch production from one to another additive machine.

In accordance with embodiments, system identification includes creating a model (e.g., a 'digital twin') of an additive machine, which can then be used to predict the machine's operational behavior. The accuracy of the prediction can depend on the sensor suite (e.g., what parameters, conditions are being monitored), appropriateness of model selected, quality of training data, and other factors. In addition, transfer learning works to make the development of the digital twin easier. If a digital twin of a similar class of systems is already developed, then transfer learning enables development of digital twins for similar systems based on similarities and distinctions between the existing digital twins.

A solution to a transfer learning problem can be described as follows. Given the following: a source domain (DS), a corresponding source task (TS), a target domain (DT) and a target task (TT), the objective of transfer learning enables learning in the target conditional probability distribution $P(YT|XT)$ in DT, with the information gained from DS and TS; where DS≠DT nor TS≠TT. Often in transfer learning there is a limited number of labeled target examples—often exponentially smaller than the number of labeled source examples Embodying systems and methods apply transfer learning algorithm techniques to an additive machine parameter set, so that the parameter set is transferable across additive machine domain models (i.e., different units of the same model, and/or different models). The parameter set can be adjusted by statistical learning of a functional difference(s) between the domain of the current parameter set and the domain(s) of the new parameter set(s). The knowledge of these functional differences can be used to transform data from the original domain (where the parameter set was created), to a model of a new domain. This approach allows direct application of the first parameter set in creating the second parameter set, as if all data originated in the domain of the new additive machine.

Given source additive machine Ms for which there is data $\{X, P(X)\}$ to solve for source task Ts information (e.g., process parameters, statistical process control (SPC), etc.); and given target machine Mt for which there can be limited data $[\{x, P(x)\}$ where $x<<X]$, to solve target task Tt, the following transfer learning scenarios can be solved by application of a transfer learning algorithm:

(1) Domain adaptation or Transductive Transfer learning: $[X \neq x]$, where inputs are different but source and target tasks are same. In this scenario, for example, fuel nozzle build parameters and sensor data are to be transferred from a first machine line to a parameter set for the build of the same product, but with a second machine line (the first and second machine lines can be from the same or different additive machine manufacturers). In some implementations of this scenario, some sensor data from the second machine line could be available.

(2) Cross-lingual adaptation: $[P(X) \neq P(x)]$, where range and/or distribution of inputs are different but source and target tasks are the same. In this scenario, for example, melt pool SPC model parameters are to be transferred across and/or within different geometries or scenarios to transfer process parameters from properties of a first material to properties of second (different) material.

(3) Inductive transfer learning: $[Ts \neq Tt]$, where the inputs are the same for both source and target domains but the tasks are different. In this scenario, for example, features conducive to detecting a lack-of-fusion (LoF) defect can be transferred to detecting other types of defects.

By way of example, embodying systems and methods can be used in the following scenario. If a first digital twin exists for a first group of model_1 machines, where the first digital twin has demonstrated using system identification techniques with high accuracy. Similarly, if there is a second digital twin for a group of model_2 machines, where the second digital twin also has demonstrated using system identification techniques with a high degree of accuracy. If there are more model_2 machines to be put into service, there is no need to go through extensive system identifications to develop individual digital twins for each of the added model_2 machines. Rather, in accordance with embodiments, the knowledge of similarities (and potential variances) between and/or among the machine models can be leveraged with transfer learning to develop a digital twin for each of the additional model_2 machine without the need to go through the extensive, time consuming, production reducing process of individual system identification.

In accordance with embodiments, similar concepts can be used for development of different generations of model_2 machines; or from a model_2 machine to other, different machine models (i.e., lines—whether from the same or a different manufacturer). Once the digital twin of all the machines are available, scan parameter sets developed on one machine that have been thoroughly validated, can be automatically transferred within a given accuracy to all the machines with available digital twins.

Figure 2:
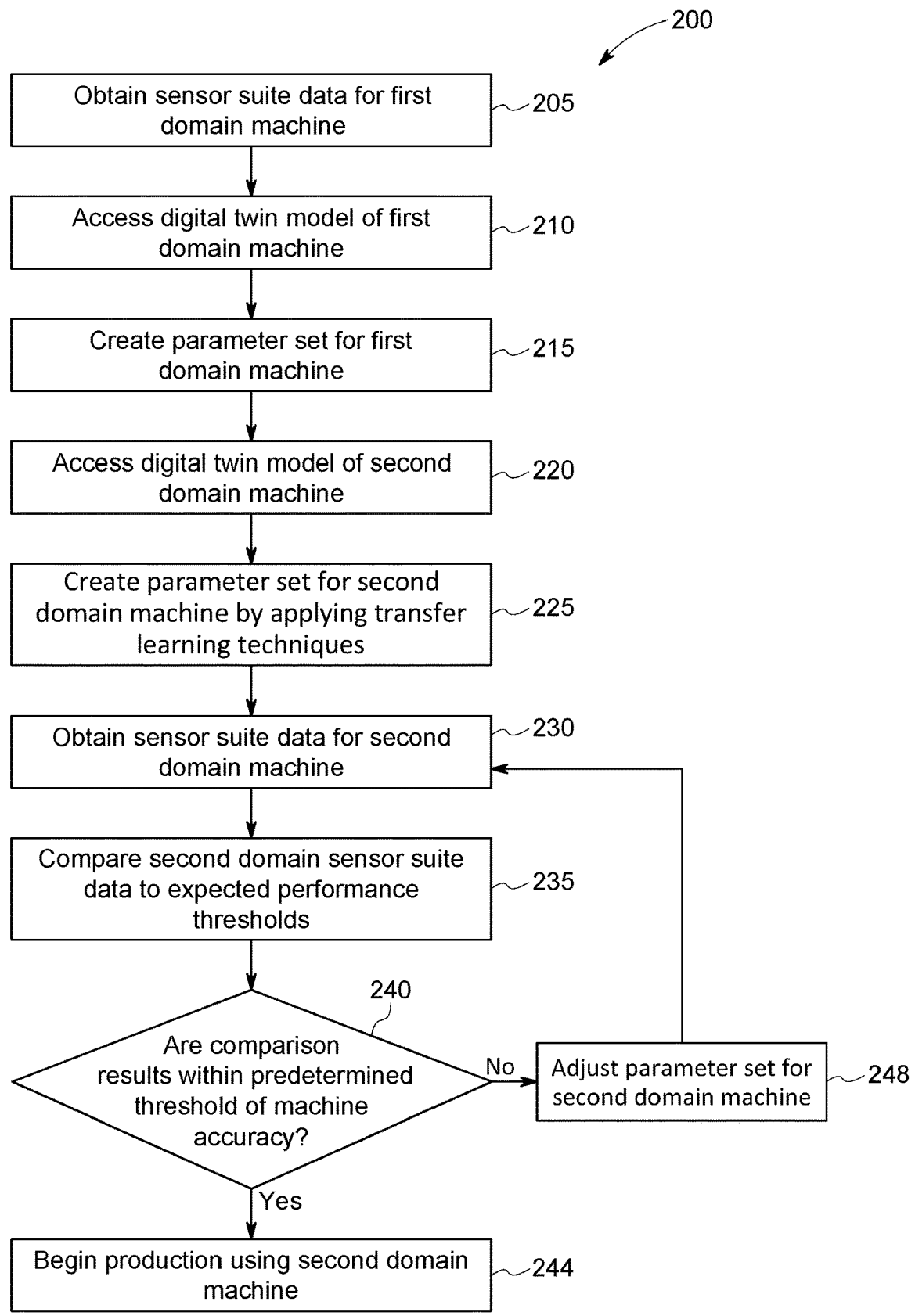
FIG. 2 illustrates a flowchart for a process to transfer an additive machine parameter set from a first domain to a second domain in accordance with embodiments.

FIG. 2 depicts process 200 for transferring an additive machine parameter set from a first domain to a second domain in accordance with embodiments. As noted above, the first and second domains can represent any one of different machine units (from the same machine line), different machine lines, and/or different deposition materials. Process 200 begins by obtaining a first set of sensor suite data for a first domain machine, step 205. The sensor suite data can monitor performance, conditions, and/or statuses of various components throughout an additive machine. These components can include, for example, laser 120, energy beam 136, powder reservoir 126, recoater arm 116, galvo scanner 132, and build plate 114. The parameters monitored can include, for example, laser pulse characteristics, reservoir temperature, arm and scanner movement and position, build plate movement and translation, deposit hatch pattern, deposition material characteristics and properties, etc. The sensor suite data can be obtained from sensor suite data records 328 stored in data store 320. In some implementations, the sensor suite data can be communicated across an electronic communication network from sensor suite 352 located in the first domain machine.

A digital twin model of the first domain machine is accessed, step 210. This digital twin model can represent parameters and dimensions of a real-world, physical additive machine. In accordance with embodiments, a robust model can consider multiple components of the machine, each component having its own micro-characteristics. In some implementations, if needed the model can be updated by historical maintenance records and/or data from sensors embedded in the system itself.

A parameter set for the first domain machine is created, step 215. The first domain parameter set is created by incorporating the sensor suite data (step 205) into the digital twin first domain model. A digital twin of the second machine domain is accessed, step 220. If not yet created, the second machine digital twin can be created at this point in process 200.

A parameter set for the second machine domain is created, step 225. Transfer learning techniques can be applied in creation of this second parameter set. For example, the first parameter set can be adjusted by statistical learning of functional difference(s) between the first domain machine and the second machine domain. This approach allows direct application of the first parameter set in creating the second parameter set, as if all data originated in the domain of the second domain additive machine.

A set of sensor suite data for a second domain machine is obtained, step 230. The sensor suite data can monitor performance, conditions, and/or statuses of various components throughout the second domain additive machine, while operating under conditions set by the second parameter set. The second domain sensor suite data is compared, step 235, to predetermined performance thresholds. These performance thresholds are the expected operational performance indicators for the second domain machine. The thresholds can represent quality assurance metrics for the product, throughput times, and other manufacturing considerations.

A determination is made, step 240, as to whether the results of the comparison are within acceptable tolerances. If so, then process 200 continues to step 244, where manufacturing use of the additive machine can begin. If the comparison (step 235) indicates that the tolerances are not within limit, then the parameter set for the second machine domain is adjusted, step 248. Process 200 then returns to step 230, where sensor suite data is obtained. This sensor suite data is an updated collection obtained from the second domain machine while it is operating under the adjusted parameter set (step 248).

Figure 3:
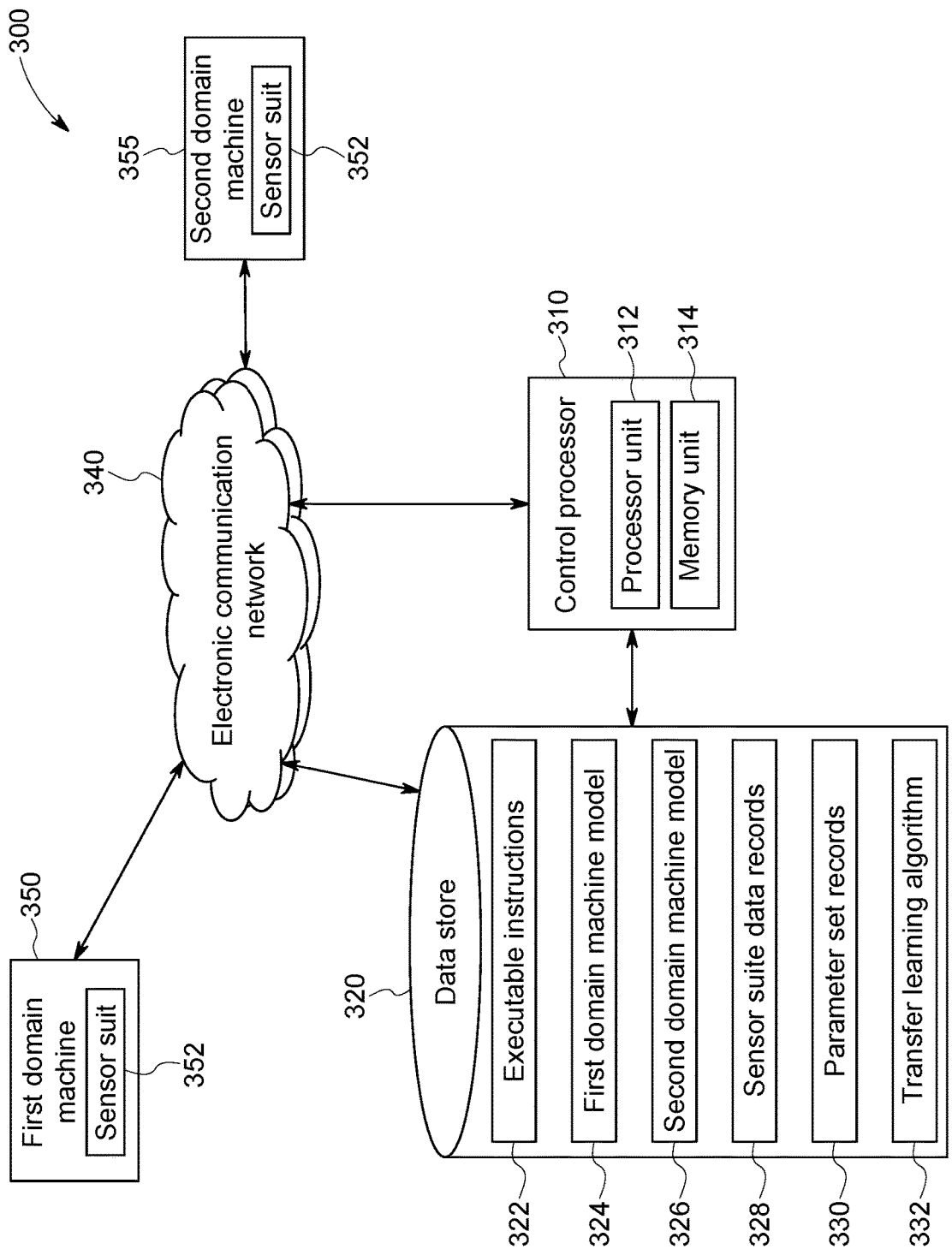
FIG. 3 illustrates a system for transferring an additive machine parameter set from a first domain to a second domain in accordance with embodiments.

FIG. 3 illustrates system 300 for transferring an additive machine parameter set from a first domain to a second domain in accordance with embodiments. Data store 320 can include first domain machine model 324, second domain machine model 326, sensor suite data records 328, and parameter set records 330.

System 300 can include control processor 310 in communication with data store 320. The control processor can be in direct communication with the data store, or in indirect communication across electronic communication network 340. Processor unit 312 can execute executable instructions 322, which cause the processor to perform transfer learning algorithm 332. Memory unit 314 can provide the control processor with local cache memory.

System 300 can include one or more additive machines 350, 355. Additive machine 350 can be of a first domain, and additive machine 355 can be of a second domain (i.e., different units of the same machine design; different machine designs; and/or different deposition material). Each additive machine can include sensor suite 352 that provides sensor data for its respective additive machine. The additive machines can be in communication with the data store across electronic communication network 340.

Embodying systems and methods provide for the automatic transfer of material parameter sets between additive machine domains, while eliminating expensive design of experiments to validate the transferred parameter set on the second domain machine. Also, in accordance with embodiments, machine calibration/recalibration efforts can be reduced. Embodying systems and methods result in reduced costs, with a commensurate increase in productivity (throughput) compared to conventional approaches for switching between machine domains.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of transferring an additive machine parameter set from a first domain to a second domain, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of transferring operational parameter sets between different domains of additive manufacturing machines, the method comprising:
  obtaining a first sensor data suite, the first sensor data suite including values monitored during operation of a first additive manufacturing machine;
  accessing a model of the first additive manufacturing machine;
  incorporating the first sensor data suite into the model of the first additive manufacturing machine to create a first machine domain parameter set,
  the first machine domain parameter set configured in a first machine domain, the first machine domain parameter set representing operational settings for the first additive manufacturing machine;
  accessing a model of a second additive manufacturing machine configured in a second machine domain;
  creating a second machine domain parameter set by applying transfer learning techniques, the transfer learning techniques comprising
    learning one or more functional differences between the first machine domain and the second machine domain,
    adjusting the first machine domain parameter set using the one or more functional differences to obtain an adjusted first machine domain parameter set,
    incorporating the adjusted first machine domain parameter set into the second machine domain to obtain the second machine domain parameter set, the second machine domain parameter set representing operational settings for the second additive manufacturing machine;
  operating the second additive manufacturing machine using the operational settings of the second machine domain parameter set, the second additive manufacturing machine producing a product sample;
  obtaining a second sensor data suite during the operation of the second additive manufacturing machine, the second sensor data suite representing monitored performance conditions of one or more components of the second additive manufacturing machine;
  comparing the second sensor data suite to one or more predetermined performance thresholds to determine if the second additive manufacturing machine produced product sample is within quality assurance metrics; and
  if the second additive manufacturing machine produced product sample is not within the quality assurance metrics, then adjusting the second parameter set.

2. The method of claim 1, further comprising:
  monitoring performance conditions of one or more components of the first additive manufacturing machine to obtain the first sensor data suite.

3. The method of claim 2, wherein the monitored performance conditions of the one or more components of the first additive manufacturing machine comprise one or more of laser pulse characteristics, reservoir temperature, arm movement, scanner movement, arm position, scanner position, build plate movement, build plate translation, deposit hatch pattern, deposition material characteristics, and deposition material properties as the monitored performance conditions.

4. The method of claim 2, wherein the monitored performance conditions of the one or more components of the first additive manufacturing machine comprise laser, energy beam, powder reservoir, recoater arm, galvo scanner, and build plate as the one or more components.

5. The method of claim 1, wherein the adjusted first machine domain parameter set comprises build parameters for the product sample.

6. The method of claim 1, wherein the first machine domain parameter set comprises deposition material characteristics or properties parameters.

7. The method of claim 1, wherein the first sensor data suite is obtained from sensor suite data records.

8. The method of claim 1, wherein the one or more predetermined performance thresholds represent expected operational performance indicators for the second machine domain.

9. The method of claim 1, wherein the monitored performance conditions of the one or more components of the second additive manufacturing machine comprise one or more of laser pulse characteristics, reservoir temperature, arm movement, scanner movement, arm position, scanner position, build plate movement, build plate translation, deposit hatch pattern, deposition material characteristics, and deposition material properties as the monitored performance conditions.

10. The method of claim 1, wherein the monitored performance conditions of the one or more components of the second additive manufacturing machine comprise laser, energy beam, powder reservoir, recoater arm, galvo scanner, and build plate as the one or more components.

11. A non-transitory computer-readable medium having stored thereon instructions which when executed by a processor cause the processor to perform a method of transferring operational parameter sets between different domains of additive manufacturing machines, the method comprising:
obtaining a first sensor data suite, the first sensor data suite including values monitored during operation of a first additive manufacturing machine;
accessing a model of the first additive manufacturing machine;
incorporating the first sensor data suite into the model of the first additive manufacturing machine to create a first machine domain parameter set, the first machine domain parameter set configured in a first machine domain, the first machine domain parameter set representing operational settings for the first additive manufacturing machine;
accessing a model of a second additive manufacturing machine configured in a second machine domain;
creating a second machine domain parameter set by applying transfer learning techniques, the transfer learning techniques comprising
learning one or more functional differences between the first machine domain and the second machine domain,
adjusting the first machine domain parameter set using the one or more functional differences to obtain an adjusted first machine domain parameter set,
incorporating the adjusted first machine domain parameter set into the second machine domain to obtain the second machine domain parameter set, the second machine domain parameter set representing operational settings for the second additive manufacturing machine;
operating the second additive manufacturing machine using the operational settings of the second machine domain parameter set, the second additive manufacturing machine producing a product sample;
obtaining a second sensor data suite during the operation of the second additive manufacturing machine, the second sensor data suite representing monitored performance conditions of one or more components of the second additive manufacturing machine;
comparing the second sensor data suite to one or more predetermined performance thresholds to determine if the second additive manufacturing machine produced product sample is within quality assurance metrics; and
if the second additive manufacturing machine produced product sample is not within the quality assurance metrics, then adjusting the second machine domain parameter set.

12. The medium of claim 11, wherein the executable instructions cause the processor to perform the method, the method further comprising:
monitoring performance conditions of one or more components of the first additive manufacturing machine to obtain the first sensor data suite.

13. The medium of claim 12, wherein the monitored performance conditions of the one or more components of the first additive manufacturing machine comprise one or more of laser pulse characteristics, reservoir temperature, arm movement, scanner movement, arm position, scanner position, build plate movement, build plate translation, deposit hatch pattern, deposition material characteristics, and deposition material properties as the monitored performance conditions.

14. The medium of claim 12, wherein the monitored performance conditions of the one or more components of the first additive manufacturing machine comprise laser, energy beam, powder reservoir, recoater arm, galvo scanner, and build plate as the one or more components.

15. The method of claim 1, wherein the adjusted first machine domain parameter set comprises build parameters for the product sample.

16. The medium of claim 11, wherein the first machine domain parameter set comprises deposition material characteristics or properties parameters.

17. The medium of claim 11, wherein the first sensor data suite is obtained from sensor suite data records.

18. The medium of claim 11, wherein the executable instructions cause the processor to perform the method, wherein the one or more predetermined performance thresholds represent expected operational performance indicators for the second machine domain.

19. The medium of claim 11, wherein the monitored performance conditions of the one or more components of the second additive manufacturing machine comprise one or more of laser pulse characteristics, reservoir temperature, arm movement, scanner movement, arm position, scanner position, build plate movement, build plate translation, deposit hatch pattern, deposition material characteristics, and deposition material properties as the monitored performance conditions.

20. The medium of claim 11, wherein the monitored performance conditions of the one or more components of the second additive manufacturing machine comprise laser, energy beam, powder reservoir, recoater arm, galvo scanner, and build plate as the one or more components.

* * * * *